United States Patent
Kittel et al.

[11] Patent Number: 5,885,695
[45] Date of Patent: Mar. 23, 1999

[54] PROCESS AND DEVICE FOR SHAPING AN EXTRUDABLE PLASTIC MATERIAL

[75] Inventors: Florenz Kittel, Würselen; Helmut Krumm, Aachen; Herbert Joeris, Würselen, all of Germany

[73] Assignee: Saint Gobain Vitrage, Courbevoie, France

[21] Appl. No.: 750,601

[22] PCT Filed: Jun. 19, 1995

[86] PCT No.: PCT/FR95/00807

§ 371 Date: Feb. 14, 1997

§ 102(e) Date: Feb. 14, 1997

[87] PCT Pub. No.: WO95/35193

PCT Pub. Date: Dec. 28, 1995

[30] Foreign Application Priority Data

Jun. 17, 1994 [DE] Germany .......... 44 21 299.2

[51] Int. Cl.$^6$ .................... B32B 9/00
[52] U.S. Cl. .............. 428/142; 428/34; 428/38; 428/76; 428/83; 428/122; 425/125; 425/127; 425/129.1; 296/84.1; 296/93; 296/95.1; 264/161; 264/250; 264/254; 156/107; 156/108; 156/244.11
[58] Field of Search ............... 428/34, 38, 192, 428/122, 426, 83, 76; 425/125, 127, 129.1; 156/107, 108, 500, 244.11; 264/511, 250, 259, 161; 296/84.1, 93, 84 A, 201, 95.1

[56] References Cited

U.S. PATENT DOCUMENTS

| 5,057,265 | 10/1991 | Kunert et al. | 264/511 |
| 5,062,248 | 11/1991 | Kunert | 52/208 |
| 5,095,669 | 3/1992 | Kunert et al. | 52/208 |
| 5,302,333 | 4/1994 | Capriotti et al. | 264/177.19 |
| 5,316,829 | 5/1994 | Cordes et al. | 428/192 |
| 5,336,349 | 8/1994 | Cornils et al. | 156/107 |
| 5,384,995 | 1/1995 | Kunert et al. | 52/394 |
| 5,456,874 | 10/1995 | Cordes et al. | 264/138 |
| 5,519,979 | 5/1996 | Kunert et al. | 52/745.15 |
| 5,547,359 | 8/1996 | Cordes et al. | 425/125 |
| 5,580,628 | 12/1996 | Cordes et al. | 428/38 |

FOREIGN PATENT DOCUMENTS

| 0 258 128 B1 | 3/1988 | European Pat. Off. . |
| 0 421 833 A2 | 4/1991 | European Pat. Off. . |
| 0 421 833 B1 | 4/1991 | European Pat. Off. . |
| 0 524 060 A1 | 1/1993 | European Pat. Off. . |
| 0 524 092 A1 | 1/1993 | European Pat. Off. . |
| 2 461 191 | 1/1981 | France . |
| 9011573 U | 10/1991 | Germany . |
| 40 25 166 A1 | 2/1992 | Germany . |

Primary Examiner—William Krynski
Assistant Examiner—Abraham Bahta
Attorney, Agent, or Firm—Pennie & Edmonds LLP

[57] ABSTRACT

This invention is related to a method for shaping profile an extrudable plastic material attached to a surface. In the process, a die being part of a cylinder and having a shape corresponding to the desired cross-section of the profile is introduced into the plastic material and is then extracted therefrom by rolling the cylinder. The invention is also related to a device for carrying out the process.

15 Claims, 5 Drawing Sheets

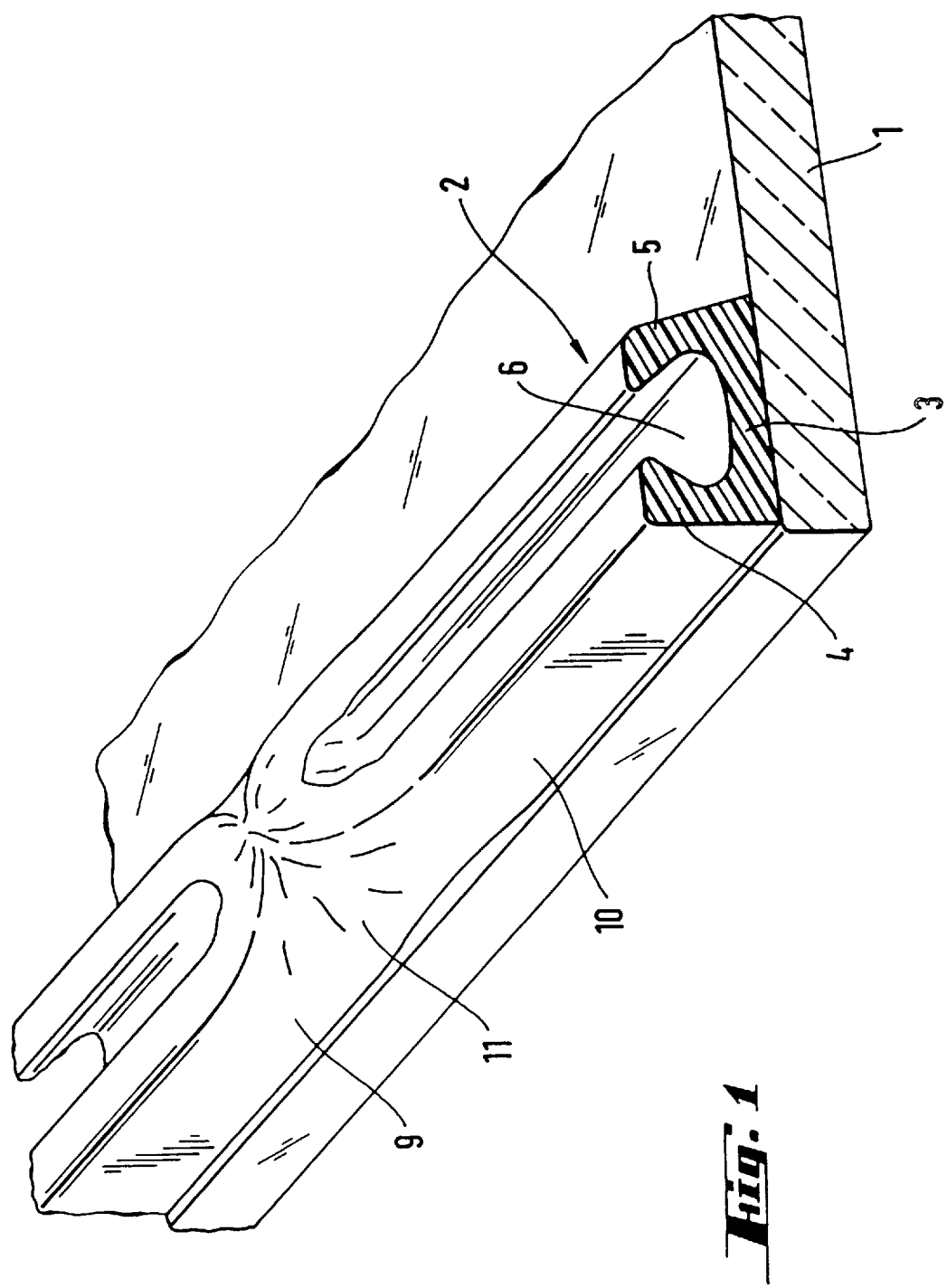

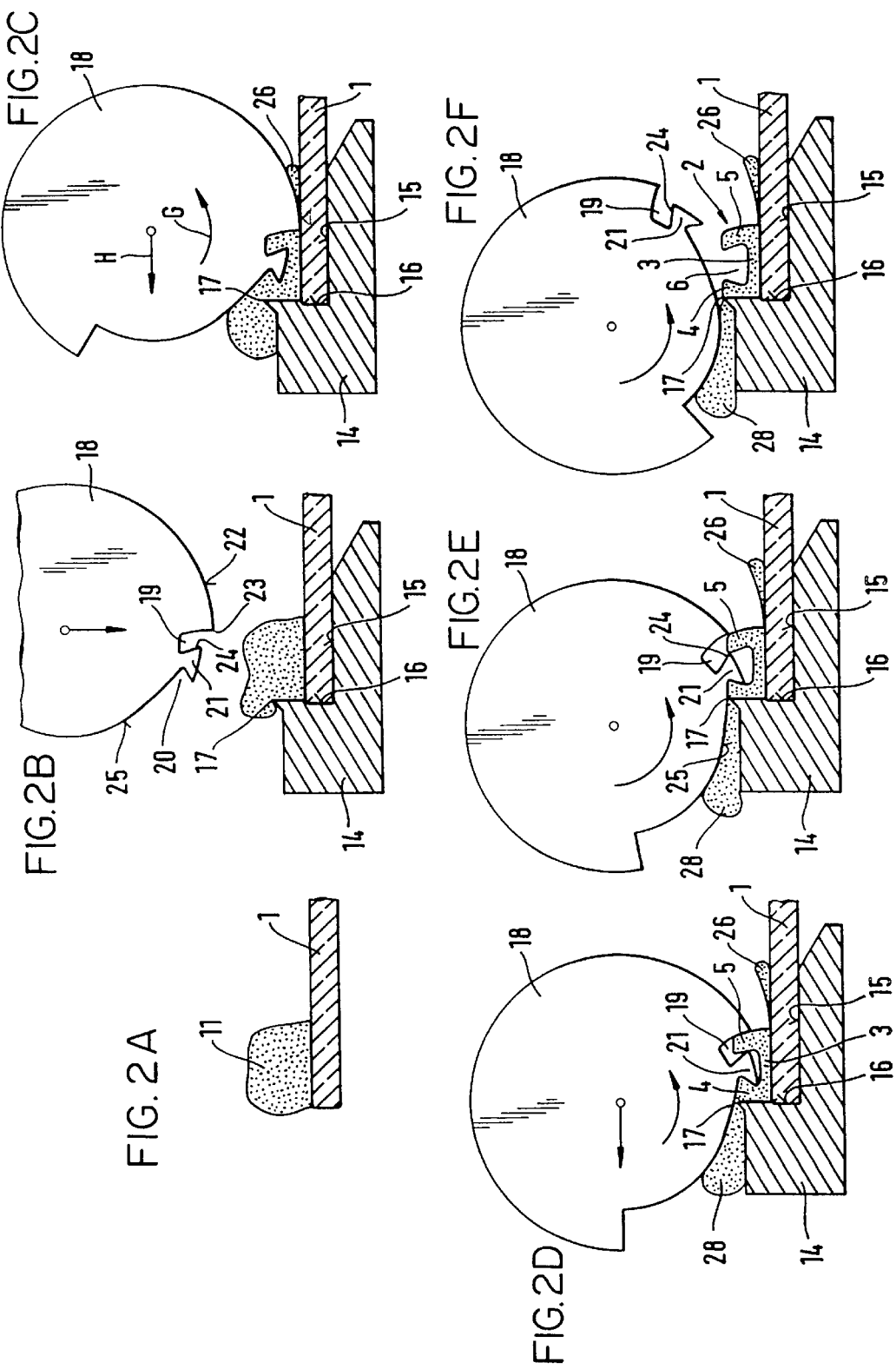

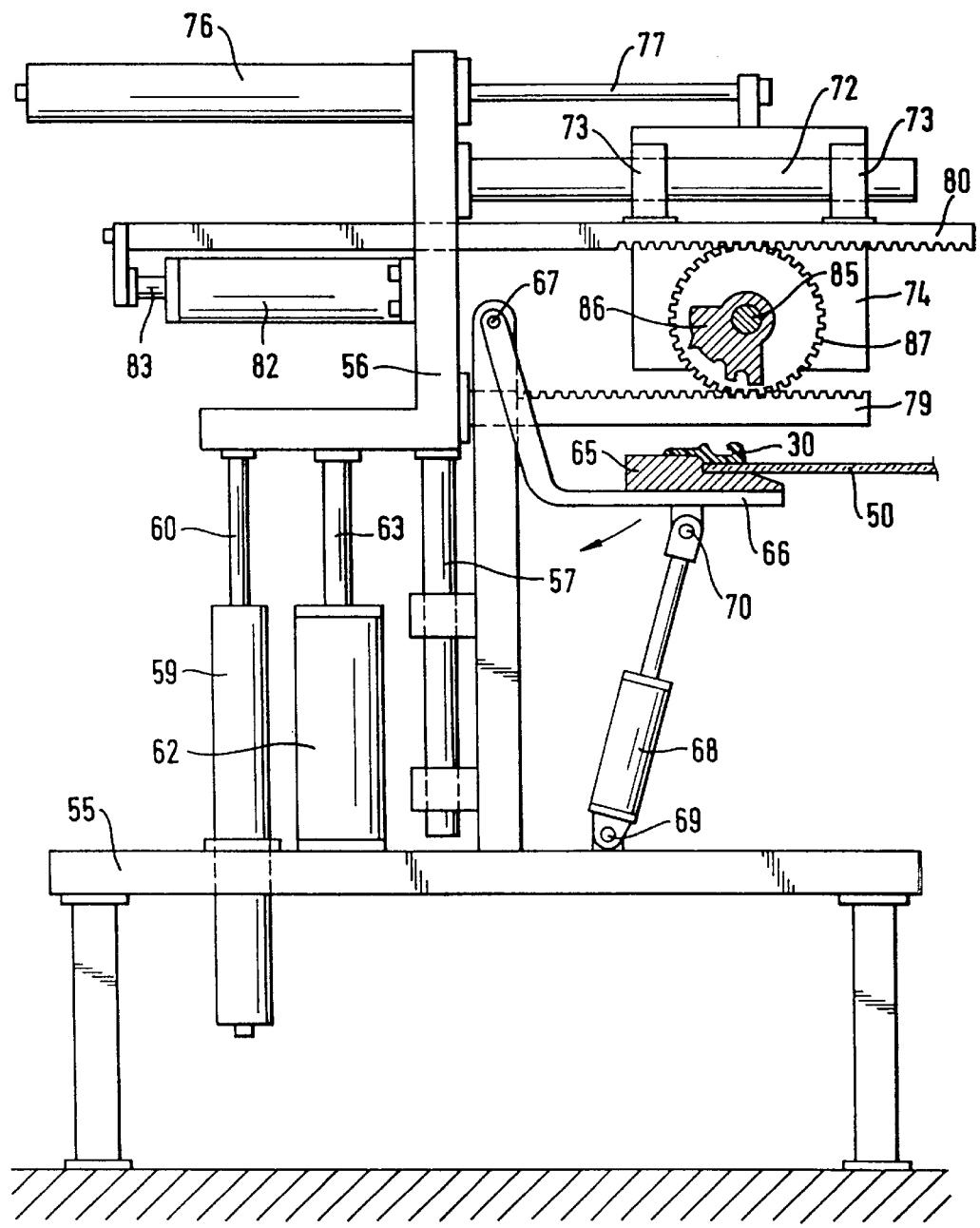

PROCESS AND DEVICE FOR SHAPING AN EXTRUDABLE PLASTIC MATERIAL

FIELD OF THE INVENTION

This invention concerns a method of post-shaping or finally shaping the transition zone between the initial part and the final part of an extruded profile constituted of a polymer, forming a closed frame, and applied onto the surface of an object and comprising a groove. In this process, a die having a shape corresponding to the desired cross-section of the profile is lowered onto the profile with pivoting. The invention concerns, in addition, a suitable device for carrying out this process.

BACKGROUND OF THE INVENTION

It is known to provide articles of various types with a frame-shaped sealing profile of polymer, and in particular of elastomer, by extruding a profiled member of extrudable material directly onto the article. For automobile panes, in particular, processes of this class are widely used. To do this, extrudable systems are used which polymerize or cross-link, such as systems of humidity-hardening polyurethane, and also thermoplastic elastomers. Processes of this class are described in detail for example, in European Patents EP-A-0 421 833 and EP-A-0 524 092.

When a profiled frame, closed on itself, is applied by extrusion onto the surface of an object, it is necessary to post-shape or finally shape the junction between the start of the extruded profiled cord and its end, because an accumulation of the viscous material inevitably takes place with a more or less undefined form. For post-shaping this undefined transition zone, various processes and devices are known.

According to a method known from DE 40 25 166 A1, in which a profiled polyurethane cord is applied by extrusion onto a surface, the extruded cord is allowed to harden, a portion of the cord is removed from the position of the transition, and a corresponding portion of a profiled cord which has already hardened is glued at this position.

According to another method known from EP-A-524 060, a portion of the profile is also removed by mechanical means after it has hardened. Then a calibrated mould, covering the two contiguous ends of the frame-shaped profile, is placed at this position and a polymer that hardens relatively rapidly is injected into the mould and hardened to complete the profiled frame.

In addition, it is known to post-shape the profiled frame at the transition position during the extrusion and before the polymer has hardened, by using tools that shape by compression. A tool known from EP-B-421 833 is composed of a lower plate, in which a moulding cavity is formed and which can be in one or more pieces. The upper compression plate is lowered onto the lower moulding plate, where it forms the profile.

A process of this type, well known and described in DE 90 115 73 U1, serves for the post-shaping of a profiled cord constituted of a reactive system based upon polyurethane and extruded and applied onto a pane. In this process, the mould is composed of a device equipped with two jaws, which is guided in the open position from the outside above the peripheral part of the pane, equipped with the profiled cord. The pivoting axis of the two jaws is disposed outside the object. After the positioning of the device of the mould, in which the surface of the pane in relation to the profiled cord is disposed in a corresponding recess of the one of the jaws, the other jaw, which imprints its form onto the cord, pivots around the pivot axis and is pressed onto the cord.

In the case in which the cord possesses a groove with an undercut or back-cut, the above-mentioned processes for post-shaping before hardening are not suitable. The same is true when the wall of the groove is fluted on one side where the wall closes in. These two arrangements are common when, as in the document EP-B-258 128, a reversible fixing is desired of an automobile pane into an opening of the bodywork. In this case, the engagement between the positioning mastic and the profiled frame is made without gluing solely on account of the shape of the groove of the profiled frame onto which the mastic engages. But by the same token, if a traditional die is used for shaping the groove, it will be impossible to remove it before hardening without definitively deforming the profile.

SUMMARY OF THE INVENTION

The invention has as its task to create a method of post-shaping the transitionzone between a frame extruded onto an object, which can be useful in very diverse cases and which is suitable also for the post-shaping of profiled sections having undercuts or anchoring flutings.

The process of this invention is characterized in that an upper pressing member in the shape of a roller, in the cylindrical surface of which is formed a mould, is conducted over the transition zone to be post-shaped by rotation about the axis of the cylinder and by translation parallel to the surface of the object and perpendicularly to the direction of the cord. Preferably, the rotation and translation movements are combined so that the pressing element rolls its surface on the cord without sliding relative to it.

More generally, the problem of the invention is to find a method of shaping a plastic material deposited onto the surface of an object so as to obtain a cord having a rectilinear groove which possesses a back-cut or anchoring flutes.

The process of this invention is characterized in that there is introduced into the material, and then extracted therefrom, a profile-shaped die having a section that is locally narrower than the groove and which is given rotary and translation movements perpendicularly to the direction of the groove, where preferably the first movement is a translatory movement towards the surface of the object and this is followed by a rotary movement and simultaneously translatory movement parallel to the surface.

In a variant, the second rotary movement and the translatory movement parallel to the surface are adjusted to one another in such a way that the movement of the die takes place without sliding on the bottom of the groove.

With advantage, the die forms part of a cylindrical roller which rolls without sliding relative to the surface of the object.

When applied to the transition zone between the start and the end of a cord having a groove, extruded in the form of a loop, the shaping process according to this invention enables the material that is inevitably in excess in the transition zone to be displaced selectively in a determined direction, that is to say in the direction of advance of the cylindrical roller, the support for the profile-shaped die. Whatever the quantity of excess material, it can spread out without hindrance. On the other hand, the rotation of the roller causes the deformation to commence very soon, that is at an instant at which the shaping proper is not yet completed. This simultaneous shaping and deformation enable special supplementary effects to be obtained. The rotation of the roller with its die makes possible, for the first time, the post-shaping of profiles comprising back-cuts or undercuts, as a result of the form and also the movements of the die. The penetration of the die takes place very progressively, its lateral displacement and its rotation finishing by giving its shape to the groove, while its extraction from the groove takes place without modifying the shape that has just been created, in particular the back-cuts and/or the corresponding anchoring flutes are not damaged and certainly not destroyed.

The movement of the roller supporting the die can vary depending upon the shape of the profiled cord which is to be post-shaped. For example, for certain profiles the roller may be conducted over the cord to be profiled by a pure rolling movement, that is to say by a displacement free of any relative sliding movement between the surface of the mass to be post-shaped and the surface of the roller in contact with it. However, at certain moments of the post-shaping of undercuts it may be necessary to regulate independently of each other the speed of rotation of the roller and the linear speed of advance. In particular, it may then be suitable to apply an increased speed of rotation during the second phase of post-shaping, in order to prevent the projections of the roller, essentially the die, which form the recesses and the back-cuts, from causing undesirable deformations of the profile.

The process according to this invention may serve for post-shaping a wide variety of polymer systems. If the profiled cord is extruded by a reactive system, it is clear that the post-shaping must take place immediately after the extrusion, before the extruded cord starts to harden by polymerization reaction. This is the case, for example, in the system of humidity-hardening polyurethane, which is today widely used, or in the two-component polyurethane systems. In contrast, when the profiled cord is extruded with a thermoplastic polymer, it is not necessary for the post-shaping to take place immediately after the extrusion; it can equally well be carried out at any later time. In this case, all that is necessary is to ensure that the material is restored to the plastic condition by suitable reheating of the mass to be post-shaped. As with the known post-shaping tools, it is necessary to choose appropriate materials for the roller or to coat the surface of the tool with suitable substances to prevent adhesion between the surface of the mould and the polymer mass to be post-shaped. Anti-adhesive coatings are known and will be chosen as a function of the polymer used in each particular case for the profile to be extruded.

The constituent material of the object onto which the loop-shaped profiled cord is to be applied by extrusion, or the shape of this object itself, is basically unimportant. For example, there are panes, in particular automobile panes, onto which a sealing frame of elastomer may be applied by extrusion, in which the seal may fulfil other functions such as, for example, the centering of the pane in the opening. It is not very important whether the pane is of glass or of transparent plastics material or whether it is covered with a transparent enamel or opaque enamel, a thin film or a plastics film. Likewise, it is possible to provide many kinds of objects with a loop-shaped profiled cord, where this cord also then has a function other than that of assuring sealing.

Other characteristics, advantages and details of the invention will be apparent from the Claims and the description of various examples of embodiment, illustrated by the drawings, in which:

BRIEF DESCRIPTION OF DRAWINGS

FIG. 1 shows schematically the transition zone of a profiled frame applied onto a glass sheet by the extrusion process, FIGS. 2A–2F show schematically the successive phases of the post-shaping of the profile shown in FIG. 1, FIGS. 3A–3F show schematically the successive phases for a profiled frame having a different profile section, FIG. 4 shows, in lateral view, a device for carrying out the process.

DETAILED DESCRIPTION OF THE INVENTION

Figure 3A:
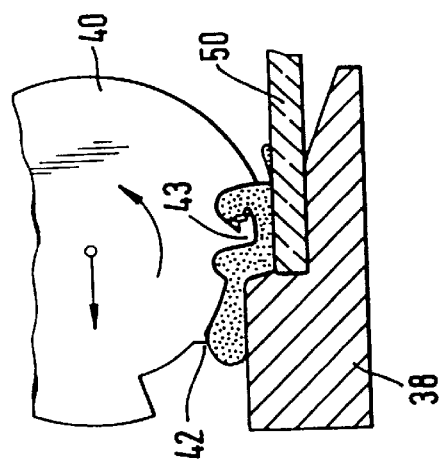
Figure 3B:
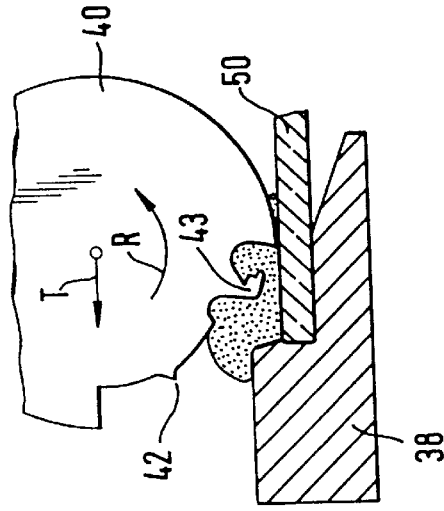
Figure 3C:
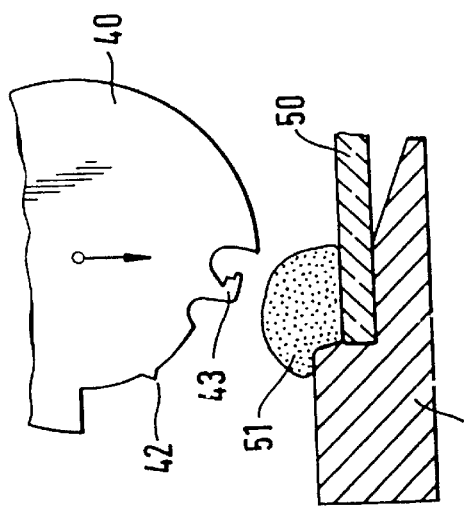
Figure 3D:
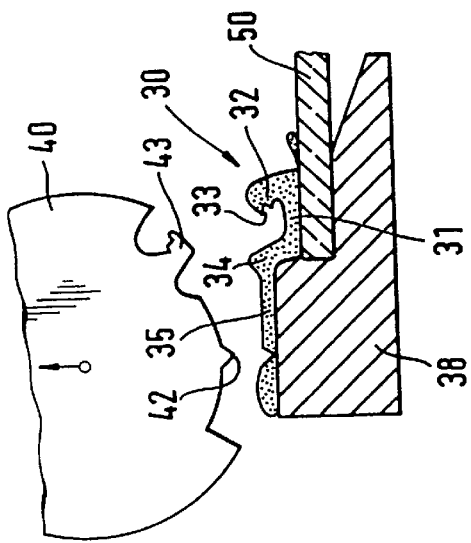
Figure 3E:
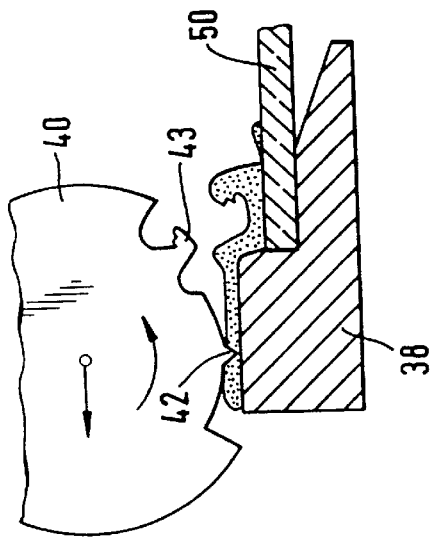
Figure 3F:
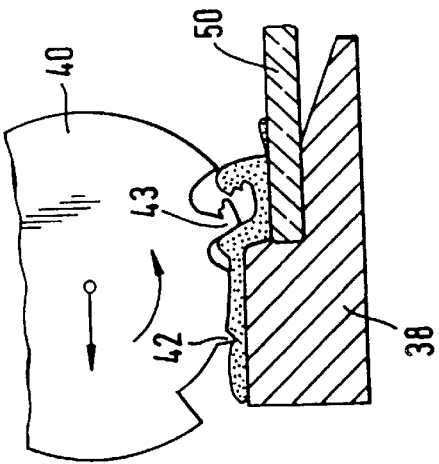

The process according to this invention is described below in connection with the pre-equipment of glass sheets, such as automobile panes, intended to be mounted by gluing. FIG. 1 shows, in section, a glass sheet 1 of this class, which is provided on its edge with a peripheral profile 2. The peripheral profile 2 is composed of an extrudable elastomer and is applied by extrusion onto the surface of the glass by means of an extrusion head in relative motion with respect to the pane and notably conducted by a robot around its periphery after prior treatment of the surface of the pane.

The profiled cord 2 is essentially of U-section with a base 3 and two lateral walls 4 and 5. The internal opposite surfaces of the one and the other of the lateral walls 4 and 5 form, with the base, a groove 6 which widens out downwards. During the installation of the glass sheet by gluing, the gluing cord is extruded into this groove 6. By choosing appropriate materials for the profiled cord 2 and/or for the gluing cord, it is possible to prevent adhesive sticking between the two materials in such a way that the connection between the glass sheet and the gluing cord takes place solely or at least mainly by mechanical anchorage of the gluing cord in the groove 6 with an undercut shape. This gives an important advantage when it is necessary later to remove the glass sheet for any reason whatever, because the removal of the pane can be caused simply by pressing on the glass sheet, the elastically deformable lateral walls 4 and 5 of the profiled cord 2 yielding and becoming detached from the mass of hardened mounting adhesive.

It will be understood that the frame-shaped profiled cord 2 must comprise a groove from end to end for the mounting by gluing of a glass sheet of this class to be perfect. Nevertheless, it is not possible to produce a continuous channel 6 by extrusion in the transition zone of the profile 2, that is to say at the position of the initial segment 9 and of the final segment 10 of the extruded profile. In fact, when the extruder die is placed in position and is raised, irregular and deformed transition zones 11 form at these positions, which zones must be post-shaped by a supplementary operating phase.

The process of post-shaping this transition zone 11 on the surface of the pane 1, the profiled cord of which has the cross-section shown in FIG. 1, is illustrated in detail in FIG. 2. For carrying out this process, a lower mould 14 and an upper mould 18 are required. The lower mould 14 comprises a bearing surface 15 for the glass sheet 1 and a lateral surface 16, perpendicular to the former, which serves as support for the edge face of the pane 1. In addition, at the upper end of the lateral surface 16, there is a sharp arris 17, which has the shape of a cutting edge and the purpose of which will be explained later. On this lower mould part 14, the glass sheet 1 is placed in the transition zone and it is pushed against the lateral surface 16 of the mould. The portions of polymer mass which project beyond the edge of the sheet are thus laterally limited, so that the cord of polymer 11 terminates flush with the edge face of the glass sheet.

The upper pressing element 18 is composed of a rotatably mounted roller, the pressing surface proper of which has the shape of a cylindrical segment, in the lateral surface of which is formed the pressing structure. The axis of rotation of this tool corresponds to the axis of the cylindrical segment. The shaft carrying the pressing element 18, which is not shown in the schematic sketch, is mounted in such a way that it can perform a translatory movement parallel to itself, that is to say while remaining parallel to the edge face of the pane.

It is possible to see in detail in FIGS. 2A–2F that the moulding structure properly speaking consists of a cavity 19 formed in the lateral surface which, during the rotation, shapes the lateral rib 5 of the profile, of a cavity 20 which shapes the side and the top of the lateral rib 4, and of a dovetail-shaped die 21, which forms the groove 6 of the profile as the pressing element rolls over. The precise contour of the cavities 19 and 20 and of the die 21 depend upon the cross-section of the profiled cord that is desired in each case and their construction should be determined step-by-step.

FIGS. 2A–2F show various successive phases of the compression by rolling performed by means of the tools described. When the pane 1 is placed in the lower mould 14 (phase B), the upper pressing element 18 is situated in a position above the glass sheet 1 such that the sharp arris (cutting edge) 23 formed by the cylindrical outer surface 22 of the upper pressing element and by the lateral surface of the cavity 19 is situated exactly above the periphery of the lateral wall 5 of the cord. In this position, the upper pressing tool descends until the sharp arris 23 almost touches the surface of the glass. During this phase C, the surplus polymer mass is pushed from the transition zone 11, at the side towards the surface of the glass sheet, and pushed laterally. The remaining band 26 thus formed is easy to remove afterwards from the surface of the glass, after hardening. On the other hand, when the upper pressing element 18 penetrates, the dovetail-shaped die 21 penetrates into the polymer mass and commences to form the groove 6. As soon as the sharp arris 23 reaches its final position just above or directly on the surface of the glass, the element 18 commences its rotation in the sense of the arrow G and its simultaneous translation in the sense of arrow H.

The rotation and translation of the element 18 continue, so that the succeeding movement phase D consists of pure rolling. During this phase, the surface of the mould defining the cavity 20 approaches also the sharp arris 17, and this cuts through the excess polymer mass pushed outwards. Then the rolling of the mould 18 continues again briefly, which pulls slightly upwards the material of the wall 4 of the cavity, which thins down when the die 21, as a consequence of the rotational and translatory movement, revolves and ascends. In this movement, it complies with the back-cut of the wall 4. This rolling action continues until the arris 24 forming the top limit of the die 21, can withdraw upwards by rotation without deforming the inner face of the lateral wall 5. Phase E corresponds to this instant. The translatory movement of the pressing element now stops, while the rotation continues (phase F) until the die 21 is entirely withdrawn from the groove 6 by rotation. The sliding that now takes place between the surface 25 forming the boundary of the cavity 20 and the excess polymer mass 28 does not harm the profile. At the end of phase F, the pressing element 18 is raised. The post-shaping is completed and the glass sheet 1 is withdrawn from the lower mould. The process of the invention is characterized in that a roller-shaped upper pressing element, in the surface of which a mould is formed, is conducted over the transition zone to be post-shaped by rotation about the axis of the cylinder and by translation parallel to the surface of the object and perpendicularly to the direction of the cord. Preferably, the rotational and translatory movements are combined so that the pressing element rolls its surface along the cord without sliding relative to it.

This process also enables U-section profiles to be formed, of which one lateral wall is provided with anchorage flutes projecting on the side of the groove. An example of embodiment of this class is again shown in FIGS. 3A–3F, by means of several consecutive phases of the post-shaping. In this case, the purpose is to mould a profile 30 which, at the end of the post-shaping, phase F, comprises a base 31, an inner lateral wall 32 provided with anchorage flutes 33 on the side towards the groove, an outer lateral wall 34 and a lip 35 which projects laterally from the peripheral surface of the glass sheet to serve as a sealing and centering lip during and after the installation of the glass sheet in the bodywork of the automobile.

The lower mould 38 is constituted as in the example described above. Basically, the upper pressing element 40 itself also is constructed and installed as described in the preceding example. However, as a difference from the preceding example, the cutting edge 42 which limits the lip 35 towards the outside is disposed on the upper, rotatably mounted pressing element.

The evolution of the various phases is substantially comparable to that described above. At phase a) the glass sheet 50 is positioned on the lower mould with the polymer mass forming the transition zone 51 and the tool is lowered onto the glass sheet. At the end of the lowering phase b) commences; the rolling of the pressing element in the direction of the arrows R and T, which forms the flutes 33 on the inner side of the wall 32 by means of the corresponding teeth of the die 43. This rolling of the cylinder, composed of the rotary movement R and the translatory movement T, continues while retaining the two components of the movement during phases c, d and e which follow. The translatory movement then assures that, after the moulding of the flutes 33, the die 43 moves away from the wall without the flutes 33 being deformed by the rotation of the cylinder 40. During phases d and e, the die 43 is withdrawn from the groove of the profile. At the same time, the outer wall 34 is moulded and the cutting edge 42 cuts through the excess mass of polymer while the lip is provided with a clear boundary. During phase f, the mould is raised. The glass sheet 50 with its post-shaped transition zone can now be removed from the lower mould.

Before the development of the process and of the device of this invention, when a loop-shaped cord was extruded onto the surface of an object, the cord comprising a groove with undercut (this expression covering also the flutes of FIGS. 3A–3F), it was not possible to prevent the groove from being interrupted in the connection zone between the end and the start of the extrusion. The invention has thus made it possible, for the first time, to produce an object such as a pane with a cord extruded onto its surface, where the cord possesses an uninterrupted groove with a back-cut or undercut.

A machine which enables the process to be carried out is shown in FIG. 4 with its essential characteristics. On the bed plate of the machine 55, on the one hand, a frame 56 is mounted in vertically displaceable manner. The frame 56 is mounted sliding by means of a system of rods and ball rings. The hydraulic brake 59, to which the frame 56 is connected by the bar 60, serves for damping the vertical movement. The vertical movement is governed by the jack 62, which transmits the elevation movement via the piston rod 63 to the frame 56.

Against the frame 56, in addition, a plate 66 carrying the lower part of the mould 65 is mounted to rotate about a pivot axis 67. The rotation of this plate 66 is caused by the jack 68, fixed at one end to the machine frame 55 by a pivot bearing 69 and at the other end to the plate 66 by a bearing 70.

On the vertically displaceable frame 56 there is mounted a horizontal guide shaft 72, on which a movable carriage 74 is slidably mounted. The damping and braking of the horizontal movement of the carriage 74 are assured by the hydraulic brake 76, which acts on the carriage 74 through the piston rod 77. In addition, a toothed rack 79 is fixed to the frame 56 with its teeth pointing upwards. A second toothed rack 79 is mounted displaceably against the frame 56 with the teeth downwards. The rack 80 is actuated by the jack 82, the piston rod 83 of which is connected to the rack 80.

Between the two racks 79 and 80, a horizontal shaft 85 is mounted on the carriage 74. On this shaft 85 are fixed, on the one hand, the upper pressing element 86 proper and, on the other hand, a toothed wheel. The toothed wheel is engaged both with the lower rack and with the upper rack 80. When the upper rack 80 is displaced by the jack 82, the upper pressing element 86 performs the desired rolling movement.

Figure 5:
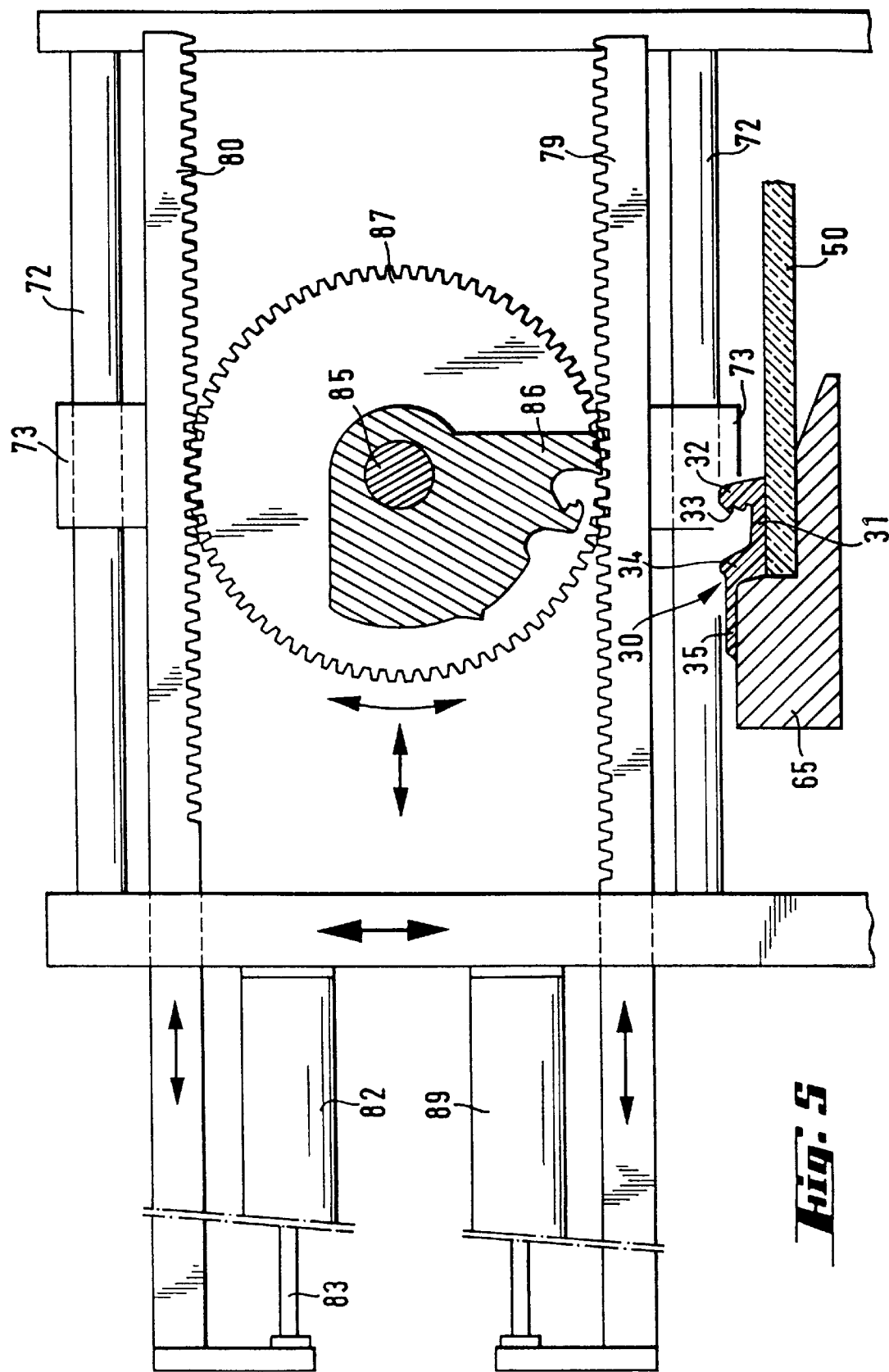
FIG. 5 shows in section another device for carrying out the process.

When, as described in the example of FIGS. 2A–2F, the translatory movement and the rotational movement must be performed independently of each other, as FIG. 5 suggests, the lower rack must also be mounted displaceably and provided with its own drive. In this case, the rack 79 is also coupled to the piston rod of a jack 89, fixed to the frame 56. By governing the horizontal movements of the two racks 79 and 80, it is now possible to perform in any manner both pure translatory movements and also rotary movements, and in addition, any desired combinations of these two movements.

To carry out the post-shaping, the glass sheet 50 is placed on the lower mould 65 and is positioned. By means of a mechanical control, not illustrated, the frame 56 is then lowered by actuating the jack 62 until the tool 86 almost touches the surface of the glass sheet 50. Then the moulding rolling of the tool 86 is performed by actuating the jack 82 and, when applicable, the jack 89. At the completion of moulding, the frame 56 is raised by operating the jack 62. Then the control of the jack 68 of the plate 66 imparts a downward tilting movement, moving away from the glass sheet, outwards. The glass sheet 50 and the post-shaped profile 30 which may perhaps adhere slightly to the mould 65 are thus detached from the mould 65. It is then easy to withdraw the glass sheet 50. In addition, the mould 65 can be provided with heating or cooling means, which depending upon the extrusion material used enables hardening to be accelerated by cooling or the reaction to be accelerated by heating the polymer.

The technique that has just been described in detail in the case of the post-shaping of a profiled cord with a transition zone where the start and the end of the extrusion of a setting plastic material are situated, can be applied in other cases: whenever it is desired to create, in such a material, a rectilinear groove with an undercut and/or when it comprises anchoring flutes.

What is claimed is:

1. A process for shaping an extrudable plastic material supported on a surface for the purpose of creating a groove in the plastic material comprising:

introducing a die having a profile shape corresponding to the shape of the desired groove into the plastic material;

imparting to the die rotary movement perpendicular to the direction of the groove; and extracting the die from the plastic material to create the desired groove in the plastic material.

2. The process of claim 1, which further comprises imparting to the die a translatory movement perpendicular to the direction of the groove to assist in removing the die from the plastic material.

3. The process of claim 2, wherein the die is first introduced into the plastic material by a translatory movement towards the plastic material and then is further introduced into the plastic material and extracted therefrom by a simultaneously rotary and translatory movement perpendicular to the direction of the groove.

4. The process of claim 2, wherein the rotary movement and the translatory movement during the extraction of the die from the plastic material are so correlated to each other that the die is moved without sliding along the base of the groove.

5. The process of claim 3, wherein the die forms part of a cylindrical roller which creates the rotary movement and the translatory movement of the die.

6. The process of claim 3, wherein the plastic material is the connecting zone of a loop-shaped cord that is the product of an extrusion process and the groove so created has a neck region that is narrower than the body region of the groove.

7. A device for shaping an extrudable plastic material supported on a surface for the purpose of creating a groove in the plastic material comprising:

a lower support;

an upper pressing element displaceable relative to the lower support which includes a cylinder rotatably mounted to the upper pressing element, the cylinder having an outer surface includes a dovetail-shaped die extending along the length of the cylinder;

means for introducing the dovetail-shaped die of the cylinder into the plastic material; and means for extracting the die from the plastic material to create the desired groove in the plastic material.

8. The device of claim 7, wherein the surface of the cylinder is configured to have a cutting edge for cutting through excess plastic material.

9. The device of claim 7, wherein the lower support is configured to have a cutting edge for cutting through excess plastic material.

10. The device of claim 7, further comprising at least one toothed rack for moving the upper pressing element.

11. The device of claim 10, further comprising a lower toothed rack and an upper toothed rack; and wherein the upper pressing element is fixed on a rotatably mounted shaft with a toothed wheel which engages both the lower and the upper toothed racks.

12. The device of claim 11, wherein one of the toothed racks is fixed and the other is laterally movable.

13. The device of claim 11, wherein the two toothed racks are mounted displaceably in their longitudinal direction and can each be movable.

14. The device of claim 7, further comprises a plate which holds the lower support and is mounted pivotally on a jack that can tilt the plate.

15. The device of claim 7, wherein the introducing means imparts rotary movement to the cylinder and the cylinder surface includes a portion of greater diameter for contacting the surface that supports the plastic material before the cylinder begins rotary movement.

* * * * *